(12) United States Patent
Charlton et al.

(10) Patent No.: US 6,975,330 B1
(45) Date of Patent: Dec. 13, 2005

(54) GRAPHIC DISPLAY OF NETWORK PERFORMANCE INFORMATION

(75) Inventors: James R. Charlton, Lenexa, KS (US); Dahl B. Metters, Shawnee Mission, KS (US); Tin Yu Mak, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 240 days.

(21) Appl. No.: 09/924,910

(22) Filed: Aug. 8, 2001

(51) Int. Cl.[7] .............................................. G09G 5/02
(52) U.S. Cl. ...................... 345/593; 345/595; 715/853; 709/225
(58) Field of Search ................... 345/440, 734–739, 345/764, 853–854, 593, 594, 595; 709/220–226; 715/734–739, 764, 853, 854

(56) References Cited

U.S. PATENT DOCUMENTS

| | | | | |
|---|---|---|---|---|
| 5,295,244 A | * | 3/1994 | Dev et al. ................... | 345/853 |
| 5,483,631 A | * | 1/1996 | Nagai et al. ................ | 345/736 |
| 5,581,797 A | * | 12/1996 | Baker et al. ................ | 345/708 |
| 5,608,854 A | * | 3/1997 | Labedz et al. .............. | 345/441 |
| 5,682,487 A | * | 10/1997 | Thomson .................... | 715/800 |
| 5,764,913 A | * | 6/1998 | Jancke et al. ............... | 709/224 |
| 5,867,483 A | * | 2/1999 | Ennis et al. ................ | 370/252 |
| 5,909,217 A | * | 6/1999 | Bereiter ..................... | 345/854 |
| 6,054,987 A | * | 4/2000 | Richardson ................. | 345/734 |
| 6,112,015 A | * | 8/2000 | Planas et al. ............... | 709/223 |
| 6,144,379 A | * | 11/2000 | Bertram et al. ............. | 345/835 |
| 6,271,844 B1 | * | 8/2001 | Selles ........................ | 715/853 |
| 6,456,306 B1 | * | 9/2002 | Chin et al. .................. | 345/810 |
| 2001/0056486 A1 | * | 12/2001 | Kosaka ....................... | 709/224 |

OTHER PUBLICATIONS

Visual Information Management for Network Configuration; Harsha Kumar et al.; Jun., 1994.
Treemaps for Space-Constrained Visualization of Heierarchies; Ben Shneiderman; Dec. 26, 1998 (updated Nov. 8, 2001).
Website: http://www.smartmoney.com/marketmap; Dow Jones & Co., Inc. and Hearst Communications, Inc.; as early as Nov., 2000.

* cited by examiner

Primary Examiner—Matthew Luu

(57) ABSTRACT

A process for graphic display of network performance information includes querying a number of platforms serving communication network functions for performance data, scaling such data to a scale of colors, displaying hierarchically linked sets of graphic objects which are color coded to represent the performance of network functions with which they are associated. Graphic selection of an object can either cause immediate display of related numeric information or can cause the display of a lower level set of objects which may be color coded to performance indexes, conventional graphic renderings of data, or alphanumeric expressions of data. The process enables effective monitoring of a complex operation and expedites isolation of network problems.

20 Claims, 6 Drawing Sheets

VOICE TEST RESULTS FOR ATLANTA, GA

04/02/2001 - 05/01/2001

Sorted by originating location and date

| City | From | Date | Test ID | Spr | ATT | MCI | Wcm |
|---|---|---|---|---|---|---|---|
| Atlanta | NY | 04/02/01 | R72890 | 85 | 84 | 84 | 85 |
| Atlanta | NY | 04/08/01 | R73868 | 72 | 84 | ** | ** |
| Atlanta | CH | 04/02/01 | R72891 | 85 | 84 | 85 | 85 |
| Atlanta | CH | 04/08/01 | R73869 | ** | ** | 85 | ** |
| Atlanta | LA | 04/03/01 | R72892 | 83 | 83 | ** | ** |
| Atlanta | LA | 04/09/01 | R73870 | ** | ** | 84 | 83 |
| Atlanta | LA | 04/15/01 | R74848 | ** | 83 | 83 | ** |
| Atlanta | LA | 04/21/01 | R75826 | 83 | 83 | ** | ** |

*FIG. 5.*

GRAPHIC DISPLAY OF NETWORK PERFORMANCE INFORMATION

BACKGROUND OF THE INVENTION

The present invention relates to telecommunications management systems and, more particularly, to an improved process for graphically displaying network performance information in a manner which is compact, organized, and intuitive to use.

Telecommunications facilitate the interactions which are necessary or desirable for many aspects of modern life, including business affairs, personal relationships, education, government functions, entertainment, and the like. Telephone systems function to establish a temporary electronic communication channel between a caller and a called party and carry electronic signals therebetween which represent the information communicated by the parties. A temporary communication channel, or call, is generally established between telephone lines of the communicating parties through "switches" which establish the particular channel and multiple line trunks which carry the communication signal between switches. The number of calls which can be simultaneously accommodated is limited by the number of switches and trunk lines available, that is, the total number of functioning switches and trunk lines in existence which are not currently occupied with calls or other "traffic".

Traffic on communication networks can include signals carrying actual vocal conversations between humans, as well as data such as communications among distributed computer systems, electronic financial transactions, facsimile signals, internet "surfing", email exchanges, network housekeeping data, and the like. New telecommunications technologies are emerging which will make further use of network throughput, such as on-line commerce, video teleconferencing, on-demand video entertainment, transmission of high quality medical images, remote control and monitoring applications, and the like.

Network traffic varies over time and date and by locality. Economics prevent network operators from providing even remotely sufficient capacity for all users to access the network simultaneously, since a large proportion of such capacity would be idle most of the time, constituting a wasted investment. In practice, telephone network operators attempt to provide adequate capacity to accommodate peak traffic, with some spare capacity to take care of unexpected traffic peaks, temporary local service outages, and short term growth. Operators of networks attempt to make the best use of existing capacity by efficient balancing of traffic loads through available switches and trunks by means of selective routing of calls. Because of the importance of activities supported by telecommunications and the volume of traffic, telecommunications network operators strive to maximize "up time" for components of the network as well as the technological quality of communication signals.

In order to carry out the mission of availability and quality, network operators must effectively monitor the flow of traffic and the performance quality of the network components. By such monitoring, congestions in traffic flow, equipment malfunctions, degradations in operation, and the like can be detected and acted upon. The diversity of factors and volume of data which must be sampled, updated, accumulated, organized, and presented in a meaningful way to effectively monitor the network are immense. It has been common practice to provide such data in text-based tabular or spreadsheet form, although graphical presentation of such data has also been implemented. The data thus provided may be either printed out or accessed and displayed in graphic form. A problem in the past has been the number of functions to be monitored, the physical difficulty in finding desired data within the mass of data available, interpretation of the significance of observed variations in data, and nonintuitive navigation of screens of displayed data.

What is needed is a method of displaying a large amount of diverse data in such an organized manner that problems can be quickly noticed and isolated as quickly as possible for corrective action.

SUMMARY OF THE INVENTION

The present invention provides a graphic process for compact and efficient presentation of a large and diverse quantity of data, particularly performance data of a digital communication network. The process of the present invention monitors a number of communication network functions and maps indexes of the functions as colors onto a set of nested or hierarchically organized displays. The displays are identified by labels, and graphic selection opens lower levels or further breakdowns of the data which can be presented as graphics, tables, or the like.

The preferred display process makes use of a technique for representing various types of hierarchical arrangements of data known as "treemaps". Development of treemap techniques is believed to have begun in the early 1990's, and are treemaps referred to in U.S. Pat. No. 5,581,797. In the present invention, an area of display is divided into a number of rectangular divisions, each associated with a particular communication network function, and labeled to indicate the function monitored. In some cases, display divisions may be subdivided into display subdivisions which reflect the overall organization of the function monitored. For example, display subdivisions could indicate an organization of a network function according to geographic regions, particular communication services, major customers, or the like.

Each network function is numerically scored according to some practical measure such as the volume of performance, speed of performance, quality of performance, or other criteria, as appropriate for the function monitored. Some functions may be scored in a binary manner, such as merely good or bad. Others may be scored within a range of gradations between excellent and undesirable. Most of the network functions are conventionally monitored in numeric terms, such that it is only necessary to covert the reported numeric information for each monitored function into a convenient scale.

In the process of the present invention, a color scale is devised to graphically or visually represent the numeric scores, such as green for a most desirable score, red for a most undesirable score, yellow for a median score, and mixtures for scores in between. The color assigned to a given score for a given function is then applied to the display division associated with the function to give an immediate visual indication of the relative performance of the function. Alternatively, variations in other graphic qualities of the display divisions can be correlated to the performance of the function monitored, such as gray scale shading, size of the rectangles, or the like.

The display area is accessible, for example, over a computer network, such as a local area network (LAN), an intranet, the internet, or the like. Preferably, a graphical application is used to enable information about the network functions to be accessible by graphical selection of the display area. The display process of the present invention may include provisions for immediate information display, such as by the use of "mouseover pop-up balloons" which open whenever a mouse cursor is placed on a display division or subdivision. The balloons preferably include information, such as numeric information, related to the function associated with a particular display division or subdivision. Actual selection of a display division or subdivision opens up a deeper layer of the graphic process which may be organized as a graphic display, a tabular or spreadsheet display of text, or the like. The lower levels of display may also include graphic display areas which are divided and subdivided as necessary. Alternatively, the lower levels may be conventional graphs of various types, such as line graphs, bar graphs, pie charts, Cartesian graphs, or the like.

Any of a number of network functions can be monitored using the processes of the present invention including, but not limited to: voice quality, fax quality, traffic volume, call setup time, call completions, and loss of synchronization or data error rates; the performance quality of certain network components, such as echo cancellers, switches, digital communication multiplexing equipment (DCME), and wavelength division multiplexing (WDM) equipment; and proprietary communication products using the communication network. The top level display division of any function can be assigned a single composite performance index and associated color or, alternatively, may be subdivided into major organizational categories with a performance index and color indicating the performance of each functional subdivision.

Other objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 5 is a diagrammatic view of a subdivision detail page displayed in response to selection of a particular display subdivision in FIG. 4.

DETAILED DESCRIPTION OF THE INVENTION

Figure 1:
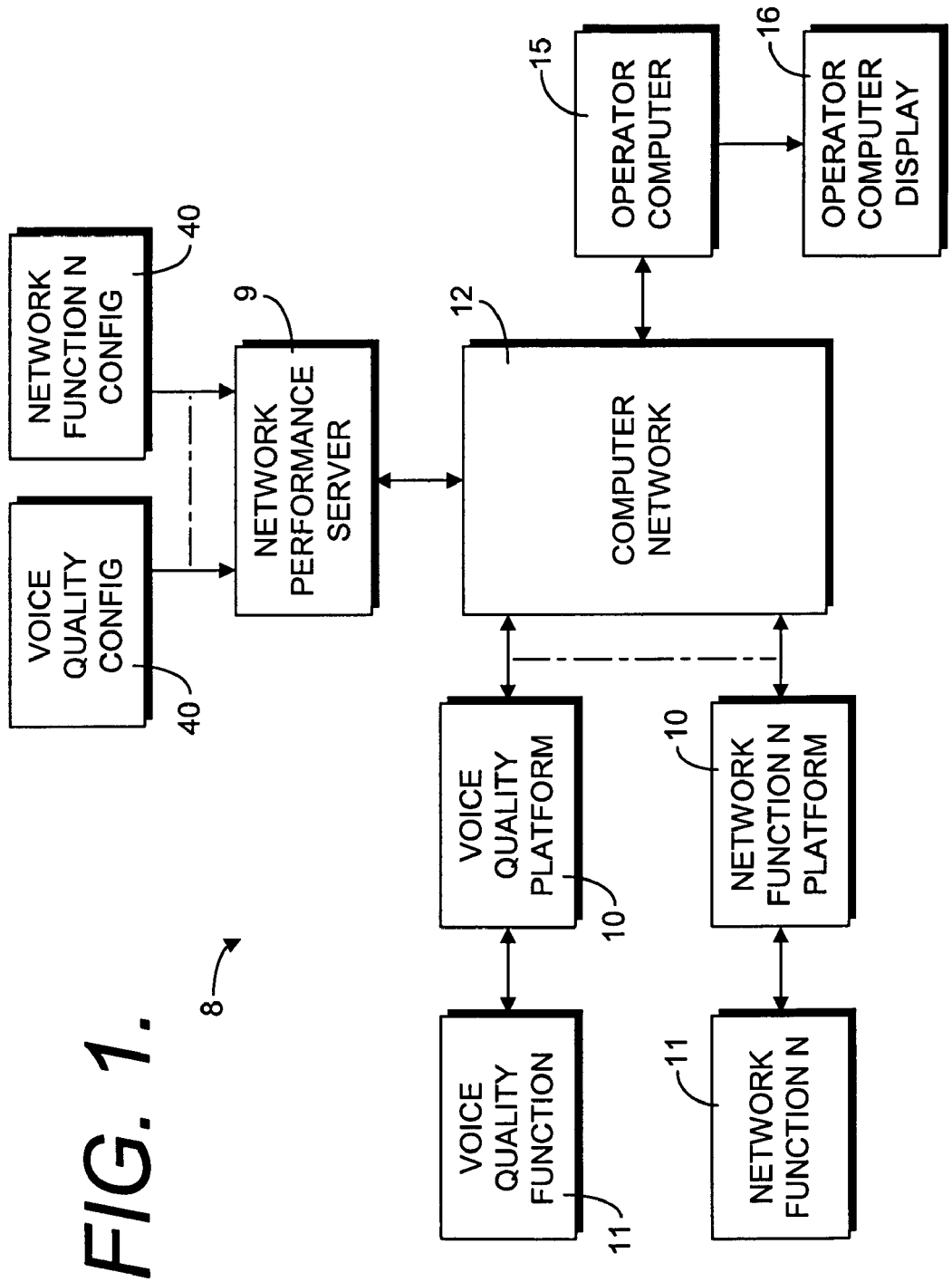
FIG. 1 is a block diagram illustrating components of a system for practicing the graphic display of network performance information of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 (FIG. 6) generally designates a process for graphically displaying network performance information according to the present invention. In general, the process 1 monitors a plurality of communication network functions having numeric or qualitative indexes of performances, proportions each index to a color scale, and displays the associated colors on a labeled primary display 3 (FIG. 2), divided according to the monitored network function. The primary display 3 links to secondary levels 4 (FIG. 4) and, possibly, tertiary levels 5 (FIG. 5) and other lower levels (not shown) to provide organized and intuitive access to network performance data to thereby enable quick, and efficiently directed, response to network problems.

FIG. 1 illustrates principal components of a simplified exemplary hardware arrangement 8 through which the process 1 of the present invention can be practiced. The hardware 8 includes a network performance server 9 which communicates with a number of platforms 10 which monitor various functions 11 of a digital communication network (not shown), such as a telephone network. The performance server 9 communicates with the platforms 10 over a computer network 12, such as a local area network, intranet, or the like, of the communication network operator. Network operators typically monitor a number of functions 11 of their network for performance factors to enable optimization of performance and correction of any problems that arise. The displays 3–5 of the process 1 may be accessed by an operator computer 15 through the computer network 12 and presented on an operator computer display device 16. The operator computer 15 and display device 16 may be monitored by a representative of the communications network operating company, such as a manager, engineer, technician, or the like.

Figure 2:
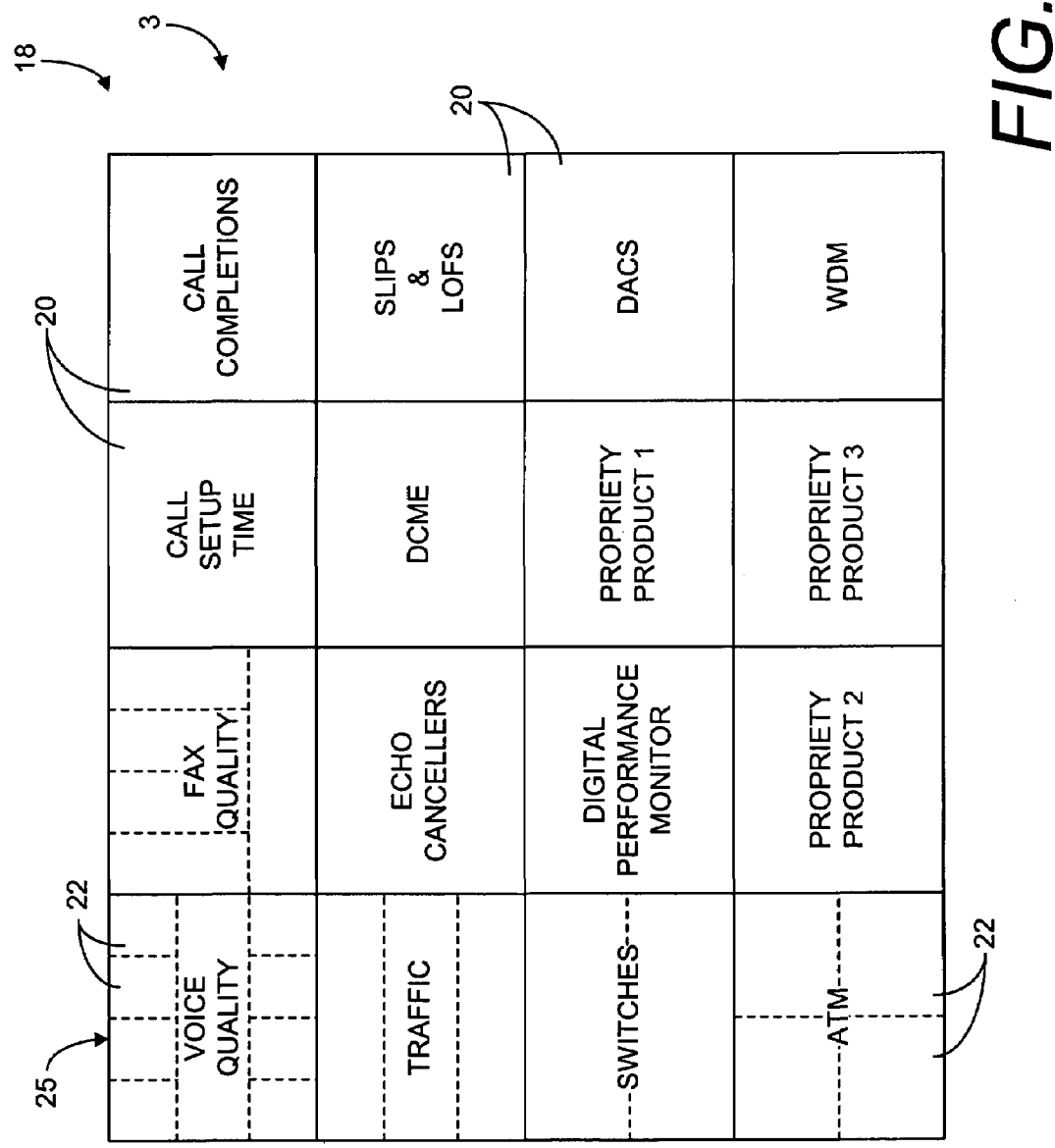
FIG. 2 is a diagrammatic view of a top level of a graphic display of network performance information, illustrating major network functions being monitored.

FIG. 2 illustrates an exemplary top-level or primary display screen 3 of the process 1. The primary screen 3 displays a graphic figure or object 20 for each major network function 11 monitored. The illustrated graphic objects 20 are rectangular blocks which are assembled into the rectangular matrix 18. The objects 20 are, thus, displayed as divisions of the primary display 3. Other shapes could, alternatively, be employed for the objects 20 and could be organized in a manner other than the rectangular matrix 3 shown in FIG. 2.

The network functions 11 which are monitored can include specific equipment components, such as switches, echo cancellers, digital communication multiplexing equipment (DCME), demultiplexing equipment (DAC's), and wavelength division multiplexing equipment (WDM); signal quality of various transmission modes, such as voice signal quality, facsimile (fax) signal quality, asynchronous transfer mode (ATM) quality, digital signal processing performance, and synchronization performance (SLIPS & LOF's (loss of frames)); communication traffic functions, such as traffic volume, call setup time, and call completions; and the performance quality of proprietary communication products and services. The functions 11 illustrated in FIG. 2 are exemplary and not intended to be exhaustive. The platforms 10 may be combinations of hardware and software which enable operation of the network functions or which monitor their operation. The platforms 10 and functions 11 are conventional and do not form parts of the process 1 of the present invention, but provide data which is processed by the present invention.

Figure 3:
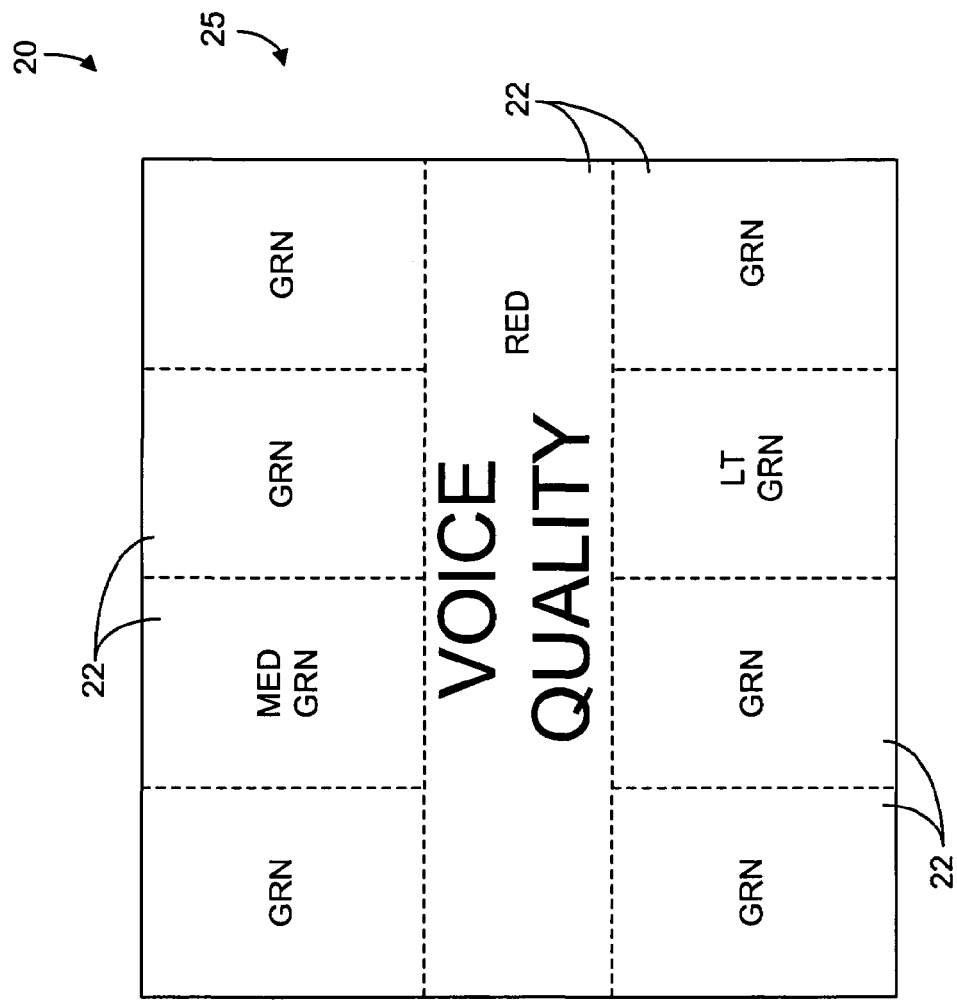
FIG. 3 is a diagrammatic view illustrating one of the major network functions being monitored by the system of the present invention, with labels representing colors associated with subdivisions of the network function.

Some of the functions 11 illustrated in FIG. 2 are subdivided into function subdivisions, symbolized by object subdivisions 22 in FIGS. 2 and 3. Such subdivisions of the functions 11 reflect the operational organization of such network functions 11, as by geographic region, major customers, classes of service, or any other appropriate category. Each of the objects 20 is labeled to indicate the function 11 monitored. Although not shown or indicated in FIG. 2, each of the objects 20 or subdivisions 22 thereof is colored according to a color scale proportioned to a range of numeric indexes of performances determined for the functions 11 associated with the objects 20 and object subdivisions 22. The colors assigned to the objects 20 and/or subdivisions give an immediate visual indication of problems with the associated network function 11, on the one hand, and the effect of any corrective actions which are taken to relieve any detected problems.

Figure 4:
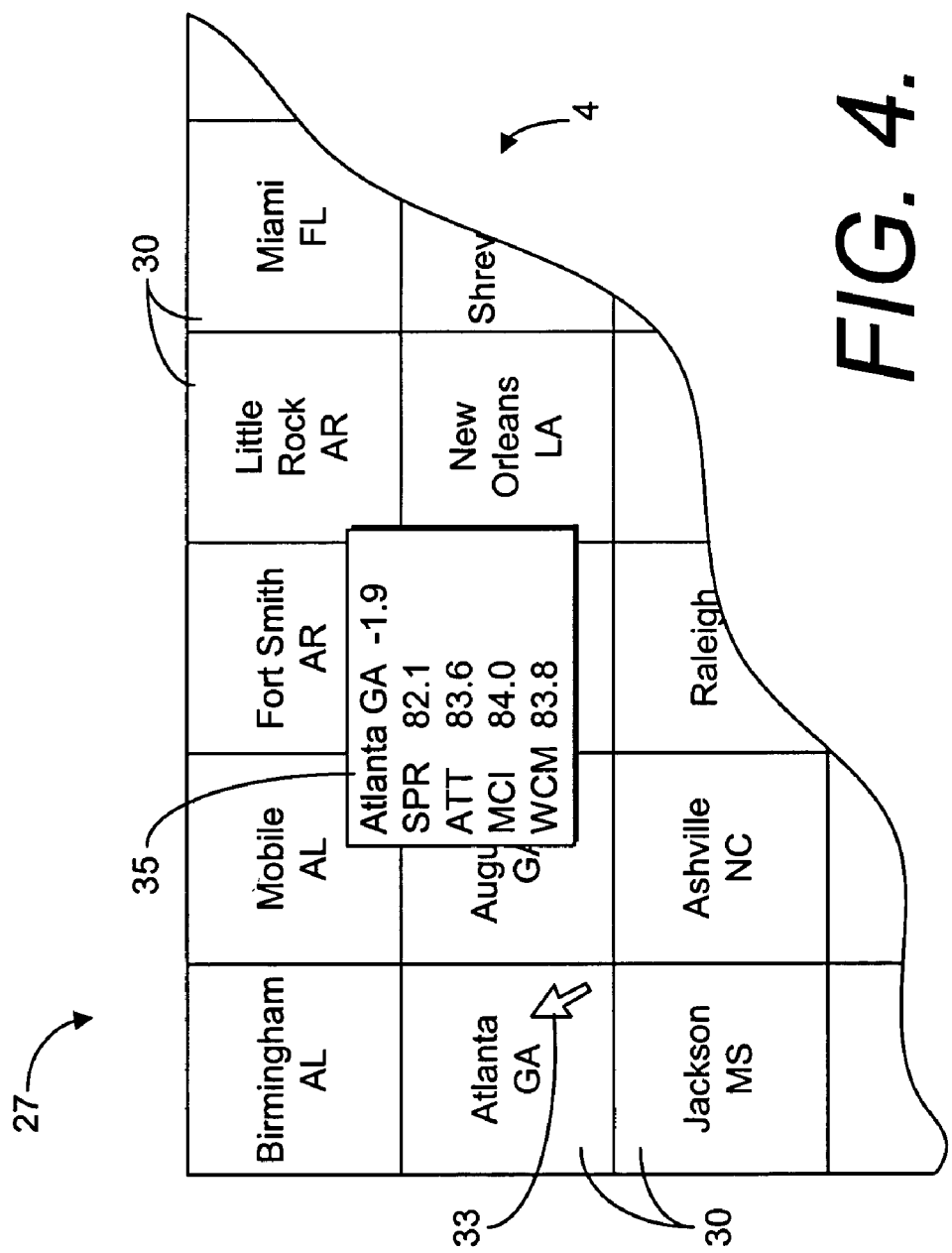
FIG. 4 is a fragmentary diagrammatic view of a second level of the graphic display illustrating subdivisions of a major network function and further illustrating a mouseover pop-up balloon providing further detailed information regarding a display subdivision on which a mouse cursor is placed.

FIG. 3 shows a graphic object 20 for monitoring the voice quality of communication signals on the network. The voice quality object 25 is subdivided, as by geographic region, and each subdivision 22 has an indication of a color, such as variations of greens, yellows, and reds, such as green (GRN), medium green (MED GRN), light green (LT GRN), or the like. Each subdivision 22 may represent an additional plurality of areas, for example, a number of cities, as is shown by a secondary voice quality level 27 (FIG. 4). The color assigned to any of the subdivisions 22, which may also be referred to as secondary objects, may be scaled to an average of the geographic regions associated with it or, alternatively, by a worst scoring component of the region. A color scale from green for good to red for bad is preferred. However, other sets of colors, monochromatic tones, graphic patterns, or the like could also be employed to graphically indicate the quality of a given division or subdivision of an object.

Graphic selection of one of the subdivisions 22 causes a corresponding secondary level 4,27 to be displayed. The illustrated secondary display 27 shown in FIG. 4 monitors network voice quality in a number of southeastern cities of the United States, which are shown as tertiary objects 30. Although not indicated in FIG. 4, preferably each object 30 is color coded according to a performance scale for the corresponding city. the color coding gives an immediate indicate of relative voice quality for calls to each city monitored.

The process 1 preferably includes the capability of quickly giving more detailed summaries of performance of the functions 11 and subdivisions and tertiary categories 30 thereof. The process 1 makes use of a common graphic technique known as "mouseover popup balloons" for this purpose. Referring to FIG. 4, a mouse cursor 33 is placed on a tertiary object 30, such as the city of Atlanta, Ga. without "clicking" or selecting the object. The process 1 detects the location of the cursor 33 and causes the display of a popup balloon 35 showing a numeric summary of the voice quality scores for the corresponding city. Mouseover popup balloons are commonly used in software with graphical user interfaces to function as a type of immediate, context sensitive help feature to indicate, for example, the function of tool icons on a tool bar of the software display. The mouseover popup balloons 35 may be used with any of the levels 3–5 of the process 1, as is appropriate, to give a more detailed degree of data than simply the relative color of the associated objects 20, 22, or 30. The data displayed in the illustrated balloon 35 in FIG. 4 is a set of averages of "figure of merit" for voice quality test calls placed over a plurality of networks to the monitored city.

Placing the mouse cursor 33 on an object 30 and selecting the object, by "clicking" or operating a selection switch, causes the process 1 to display the tertiary display 5 (FIG. 5) which is a further detailed summary, or subdivision detail page, of voice quality tests for the selected city, shown in a table format. The voice test table 37 illustrated includes the monitored city 42, the dates of the test calls 43, the test call origin locations 44, the networks used 45, the figure of merit or scores 46 for the test calls, and the test call identification number 47. The specific content of the secondary and tertiary display levels 4 and 5, and any lower levels, depends on the nature of the network function 11 monitored through the objects 20 and will vary as is appropriate. Lower levels may be graphically oriented, as treemap levels or other graphic displays, or may be text or table based, depending on the source of data and the most convenient way of presenting the data.

Figure 6:
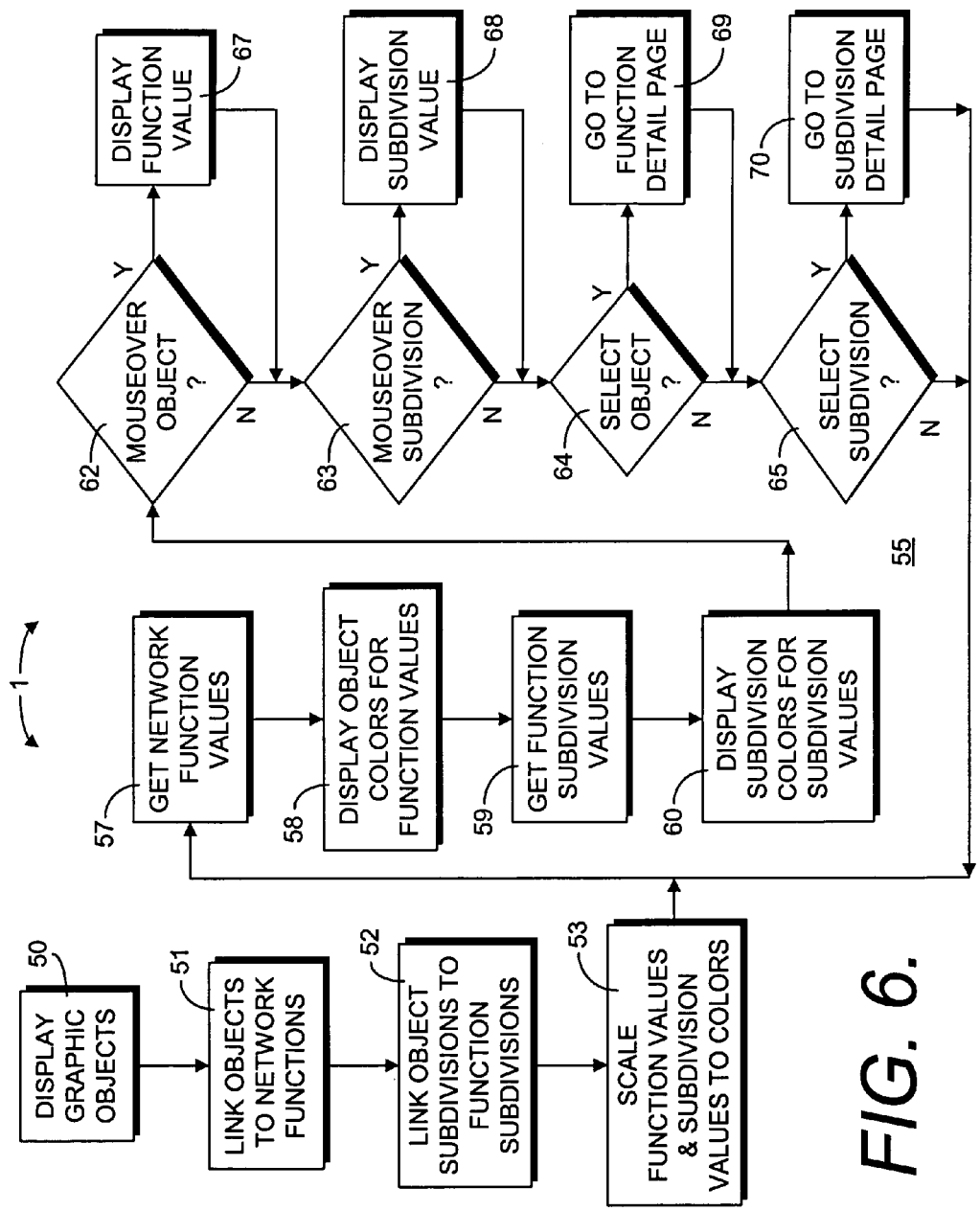
FIG. 6 is a simplified flow diagram illustrating process steps for graphically displaying network performance information according to the present invention.

FIG. 6 summarizes operation of the network performance display process 1 of the present invention, as on the network performance server 9. The server 9 includes hardware and appropriate software to process the data queried from the function monitor platforms 10 regarding the network functions 11 to generate the displays 3–5 and links thereamong. Since the network functions 11 are diverse in nature, some scaling of indexes of performance is required. For this purpose, each function 11 monitored requires the entry of corresponding configuration factors 40 (FIG. 1). The configuration factors 40 preferably convert the ranges of indexes of performance for the monitored functions to convenient scales and proportion the converted ranges of indexes to the ranges of colors to be displayed for the objects 20, 22, 30, and the like. Additionally, the configuration factors 40 determine the manner of displaying the object 20 associated therewith, the type of lower display levels 4 or 5, the types of any subdivisions 22, the type and manner of any popup balloons 35, and further specifications of the type and manner of information associated with any object 20.

Referring to FIG. 6, the process 1 displays the graphic objects 20 at step 50, links the objects 20 to the network functions at step 51, and links object subdivisions 22, if any, to subdivisions or subcategories of the functions 11 at step 52. At step 53, the function and subdivision indexes of performance or values are scaled to the colors to be displayed on the process displays 3–5. The scaling step 53 makes use of the configuration factors 40 entered into the network performance server 9. The process 1 then enters a main loop 55.

In the main loop 55, the process 1 queries the function platforms 10 for the current values of the functions 11 at step 57 and displays object colors for the function values obtained at step 58. Similarly, the process 1 queries the any function subdivisions for their corresponding values at step 59 and displays the subdivision colors for the subdivision values obtained at step 60. The process 1 continually tests for and detects mouseovers of any graphic objects 20 at test 62, mouseovers of any graphic subdivisions 22 at test 63, the selection of any object 22 at test 64, or the selection of any subdivision object 22 at test 65. If a mouseover is detected at test 62 or 63, the process 1 displays respectively a function value summary at step 67 or a subdivision value summary at step 68, as by displaying a popup balloon 35. If an object 20 is selected at test 64 or a subdivision object 22 is selected at test 65, the process 1 goes respectively to a function detail page at step 69 or to a subdivision detail page at step 70. Depending on the nature of the object 20 or subdivision object 22 selected, and the network function 11 associated therewith, the detail page may be in the form of a secondary display 4, a tertiary display 5, or the like. Once the process 1 transfers to a detail page at step 69 or 70, depending on the configuration of the next level, the process 1 may enter a new processing loop similar to the main loop 55. Although not illustrated, each display 4 or 5 below the main display 3 preferably has a link back to the next higher levels of the process 1.

In a similar manner, the remaining graphic objects 20 are linked to more detailed information regarding the status or performance of the network functions 11 they monitor. Some objects 20 may link directly to tabular displays similar to the voice quality table 37. Others may link to arrangements of secondary or tertiary graphic objects 22 or 30 which, in turn, link to further graphic objects, graphic displays, tabular displays, or simply alphanumeric expressions of data. The principal objective of the process 1 is to organize a large universe of data into a manageable arrangement of data which can be intuitively navigated to effectively monitor the operation of a large communication network and respond to problems and situations which can occur in such operation.

It is to be understood that while certain forms of the present invention have been illustrated and described herein, it is not to be limited to the specific forms or arrangement of parts described and shown.

What is claimed is:

1. A graphic process for substantially simultaneously displaying on a computer display device variations in a plurality of communication network functions and comprising the steps of:
   (a) providing access to a plurality of communication network functions, each network function having a data value within a range of data values;
   (b) dividing a display area into a plurality of display divisions;
   (c) assigning each display division to a respective network function;
   (d) scaling a variable graphic quality of each display division to said range of data values of said network function associated with said display division;
   (e) without user interaction, periodically accessing each of said network functions to retrieve a respective current data value;
   (f) displaying for each display division a respective variation of said graphic quality which corresponds to said current data value of the network function associated with said display division; and
   (g) scaling a size of a display division to said range of data values.

2. A process as set forth in claim 1 wherein said scaling a variable graphic quality includes the step of:
   (a) scaling a shade value to said range of data values.

3. A process as set forth in claim 1 wherein said scaling a variable graphic quality includes the step of:
   (a) scaling a range of colors to said range of data values.

4. A process as set forth in claim 1 wherein at least one of said network functions includes a data set of a plurality of data members, each data member having: a corresponding data member value within said range of data values, and including the steps of
   (a) dividing said display division associated with said at least one of said network functions into a plurality of display subdivisions equal to said plurality of data members of said data set;
   (b) assigning each of said display subdivisions to a respective one of said plurality of data members;
   (c) periodically accessing said at least one of said network functions to retrieve a respective current data member value of each of said plurality of data member; and
   (d) displaying for each display subdivision a respective variation of said graphic quality which corresponds to a current data member value of the data member associated with said display subdivision.

5. A process as set forth in claim 1 and including the steps of:
   (a) linking at least one of said display divisions to additional information associated with said network function associated therewith; and
   (b) displaying said additional information in response to graphic selection of said display division.

6. A process as set forth in claim 1 and including the steps of:
   (a) linking at least one of said display divisions to graphically encoded information associated with said network function associated therewith; and
   (b) displaying said graphically encoded information in response to graphic selection of said display division.

7. A process as set forth in claim 1 and including the steps of:
   (a) linking at least one of said display divisions to additional information associated with said network function associated therewith; and
   (b) displaying said additional information in response to placement of a graphic cursor within said display division.

8. A process as set forth in claim 1 wherein said variable graphic quality varies in discrete steps, and said process including the step of;
   (a) displaying for each display division a respective step variation of said graphic quality which corresponds to said current data value of the network function associated with said display division.

9. A process as set forth in claim 1 and including the step of:
   (a) displaying human readable indicia on at least one of said display divisions to thereby identify a network function associated with said one display division.

10. A graphic process for substantially simultaneously displaying on a computer display device variations in a plurality of communication network functions and comprising the steps of:
   (a) providing access to a plurality of communication network functions, each network function having a data value within a range of data values;
   (b) dividing a rectangular display area into a plurality of display divisions;
   (c) assigning each display division to a respective network function;
   (d) for each network function, scaling a set of a plurality of colors to the range of data values of said network function;
   (e) without user intervention, periodically accessing each of said network functions to retrieve a respective current data value;

(f) displaying for each display division a respective one of said colors which corresponds to said current data value of the network function associated with said display division;

(g) linking at least one of said display divisions to additional information associated with said network function associated therewith; and (h) displaying said additional information in response to placement of a graphic cursor within said display division.

11. A process as set forth in claim 10 wherein at least one of said network functions includes a data set of a plurality of data members, each data member having a corresponding data member value within said range of data values, and including the steps of:

(a) dividing said display division associated with said at least one of said network functions into a plurality of rectangular display subdivisions equal to said plurality of data members of said data set;

(b) assigning each of said display subdivisions to a respective one of said plurality of data members;

(c) periodically accessing said at least one of said network functions to retrieve a respective current data member value of each of said plurality of data member; and (d) displaying for each display subdivision a respective one of said colors which corresponds to a current data member value of the data member associated with said display subdivision.

12. A process as set fort in claim 10 and including the steps of:

(a) linking at least one of said display divisions to additional information associated with said network function associated therewith; and (b) displaying said additional information in response to graphic selection of said display division.

13. A process as set forth in claim 10 and including the steps of:

(a) linking at least one of said display divisions to graphically encoded information associated with said network function associated therewith; and (b) displaying said graphically encoded information in response to graphic selection of said display division.

14. A process as set forth in claim 10 and including the step of:

(a) displaying respective human readable indicia on each of said display divisions to thereby identify a network function associated with said display division.

15. A process as set forth in claim 10 and including the step of:

(a) scaling a size of a selected display division to a variable associated with a network function to which said selected display division is assigned.

16. A graphic process for substantially simultaneously displaying on a computer display device variations in a plurality of communication network functions and comprising the steps of:

(a) providing access to a plurality of communication network functions, each network function having a data value within a respective range of data values;

(b) at least some of said network functions including a plurality of data members, each data member having a corresponding data member value within a respective range of data values;

(c) dividing a rectangular display area into a plurality of rectangular display divisions;

(d) assigning each display division to a respective network function;

(e) dividing each display division associated with a plurality of data members into a plurality of rectangular display subdivisions representing the associated plurality of data members;

(f) for each network function, scaling a color set of a plurality of colors to a range of data values of said network function;

(g) displaying human readable indicia on each of said display divisions to thereby identify a network function associated with said division;

(h) periodically accessing, without user interaction, each of said network functions to retrieve a respective current data value;

(i) displaying for each display division and display subdivision a respective one of said colors which corresponds to the current data value of the network function associated with said display division or display subdivision; and (j) scaling a size of at least one display subdivision to a variable associated with a data member represented by said one display subdivision.

17. A process as set forth in claim 16 and including the steps of:

(a) linking each of said display divisions and display subdivisions to additional information regarding the network function associated therewith; and (b) displaying said additional information in response to graphic selection of said display division.

18. A process as set forth in claim 16 and including the steps of:

(a) linking at least one of said display divisions to graphically encoded information regarding the network function associated therewith; and (b) displaying said graphically encoded information in response to graphic selection of said display division.

19. A process as set forth in claim 16 and including the steps of:

(a) linking at least one of said display divisions to additional information associated with said network function associated therewith; and (b) displaying said additional information in response to placement of a graphic cursor within said display division.

20. A process as set forth in claim 16 and including the step of:

(a) scaling a size of at least one of said display divisions to a variable associated with the network function to which said display division is assigned.

* * * * *